United States Patent
Collet et al.

(10) Patent No.: US 12,363,547 B2
(45) Date of Patent: Jul. 15, 2025

(54) METHOD TO MONITOR THE MANAGEMENT OF NETWORK SLICES

(71) Applicant: THALES DIS FRANCE SAS, Meudon (FR)

(72) Inventors: Hervé Collet, Plan de Cuques (FR); Ly Thanh Phan, Le Plessis Robinson (FR)

(73) Assignee: THALES DIS FRANCE SAS, Meudon (FR)

( * ) Notice: Subject to any disclaimer, the term of this patent is extended or adjusted under 35 U.S.C. 154(b) by 402 days.

(21) Appl. No.: 17/982,804

(22) Filed: Nov. 8, 2022

(65) Prior Publication Data
US 2024/0155353 A1    May 9, 2024

(51) Int. Cl.
*H04W 16/10* (2009.01)
*H04W 12/037* (2021.01)

(52) U.S. Cl.
CPC ......... *H04W 16/10* (2013.01); *H04W 12/037* (2021.01)

(58) Field of Classification Search
CPC ............................. H04W 16/10; H04W 12/037
See application file for complete search history.

(56) References Cited

U.S. PATENT DOCUMENTS

| 2008/0300017 | A1* | 12/2008 | Choi | ................... | H04N 21/4182 |
| | | | | | 455/558 |
| 2021/0250890 | A1* | 8/2021 | Won | ...................... | H04W 76/50 |
| 2022/0078872 | A1* | 3/2022 | Shrestha | ............... | H04W 76/30 |

FOREIGN PATENT DOCUMENTS

WO   WO-2022029637 A1 *   2/2022   ............ H04W 48/18

* cited by examiner

*Primary Examiner* — Samina F Choudhry

(57) ABSTRACT

Provided is a method to monitor the management of network slices by a communication device (ME) having a secure element (USIM), said communication device being compliant with at least a technology implementing network slicing using a route selection policy, said communication device further supporting a USIM application toolkit framework implementing event download envelops, said secure element having a memory to store rules for the route selection policies, said method comprising the steps of, for the communication device active in a network of the technology implementing network slicing. It receives a slice status and slice information from the network, and pushes the slice status and slice information to the secure element using an event download envelop as defined in the USIM application toolkit framework supported by the communication device.

15 Claims, 1 Drawing Sheet

METHOD TO MONITOR THE MANAGEMENT OF NETWORK SLICES

FIELD

The present invention relates to a method to monitor the management of network slices by a communication device having a secure element.

The invention also pertains to a communication device and to a secure element implementing said method.

BACKGROUND

5G Network slice is used in 5G to provide adapted QoS to specific applications. Currently five slice service types (SST) are defined as disclosed in 3GPP TS 23.501, clause 5.15.2.2, but it is awaited that this number will increase with the 5G needs developments. Also, in each five slices service type, differentiators specifically depending on the operator generate a multiplication of the identifiers of the slices in the environment of the device.

With 5G slicing introduction, application should ensure that served slices is aligned with its data and/or power consumption requirements when slice is available. The slice management is thus a growing challenge.

As defined in the standards, a communication device (ME in the following) selects a network slice based on user equipment routing selection policy (URSP) rules provided either by the network or provided by the USIM. Such URSP rules are generally under the control of an operator (PLMN). A secure element (USIM in the following) is advantageously used, said USIM being configured by a Home PLMN with at least such URSP rules. Such a secure element is installed in the ME. According to the standards (3GPP TS 24.526) a URSP rule is composed of:
- a precedence value of the URSP rule identifying the precedence of the URSP rule among all the existing URSP rules;
- a Traffic Descriptor;
- and one or more Route Selection Descriptors.

The ME selects a URSP rule by matching the characteristics of a Packet Data Unit (PDU) session establishment requested by an application with the Traffic Descriptor part of a URSP rule and based on the rule precedence value a.k.a priority of such URSP rule. The Traffic Descriptor part of the URSP rule is a list of selection criteria used by the ME, that characterize a PDU session and the requesting application (e.g. requested destination IP address, requested Data Network Name, Application Identifier . . . ). More information about the URSP stored in USIM are found in 3GPP TS 31.102, clause 4.4.11.12. As defined in the standard, a communication device ME having a secure element USIM is a user equipment UE.

Currently, 3GPP TS 31.111 specification enables the USIM to request the status relative to slices based on a polling mechanism. More precisely, specification was agreed related to PROVIDE LOCAL INFORMATION 'slice(s) information' which is a way for an USIM application to retrieve the information if slices are served only. Currently, no information is available about Allowed or rejected slices.

According to this specification, application on the USIM needs to regularly ask for slice information. Typically, every 30 seconds, the USIM requests the ME to provide an update of the slice information. Such an implementation is not fully satisfactory as slice information can be missed if PROVIDE LOCAL INFORMATION 'slice(s) information' is asked before the slice is requested by the ME or after a slice is no more accessed, e.g. after PDU sessions using that slice has been released. The polling mechanism enables the USIM only to know about a served slice status at the moment the ME is polled. Typically, a change in the status of a slice, e.g. Served Slice is no more accessed by any PDU sessions, thus is no more a served Slice, can be missed if the Slice Status change polling request by the USIM arrives too late to the ME. Furthermore, a rejected Single-Network Slice Selection Assistance Information (S-NSSAI in the following) information cannot be shared with the USIM when Network Slice-Specific Authentication and Authorization failed. Thus, such slice status information, e.g. Slice request was rejected by the network, and the reason for such status, e.g. rejection due to not availability of the slice, or congestion, cannot be retrieved by the USIM with such polling mechanism.

Also, for the coming needs of slice management, existing polling method would require to increase the frequency of polling. Increasing the polling frequency impact negatively the battery consumption, which is not an option in general but in particular in IoT use cases. Thus unnecessary power consumption is generated by the polling mechanism, which reduce the battery lifetime. Indeed, the known PROVIDE LOCAL INFORMATION 'slice(s) information' mechanism usage could imply too important reduction of battery lifetime. This would be in general not optimum, and even unacceptable in an IoT use case.

Thus, existing polling mechanism allows the USIM to acquire the knowledge of the status of slice requests made by the ME. However, such mechanism does not allow the USIM to get all the status change at the right time. Information may be lost for low polling frequency. Also power consumption is too high when polling frequency is too high.

Further alternative and advantageous solutions would, accordingly, be desirable in the art.

SUMMARY OF THE INVENTION

The present invention aims at reliably monitoring the slice management at low cost in term of power consumption.

The present invention is defined, in its broadest sense, as a method to monitor the management of network slices by a communication device having a secure element, said communication device being compliant with at least a technology implementing network slicing using a route selection policy, said communication device further supporting a USIM application toolkit framework implementing event download envelops, said secure element having a memory to store rules for the route selection policies, said method comprising the steps of, for the communication device active in a network of the technology implementing network slicing:
  receiving a slice status and slice information from the network,
  pushing the slice status and slice information to the secure element using an event download envelop as defined in the USIM application toolkit framework supported by the communication device.

With the invention, all status of the slice, not limited to served slice but extended to allowed and rejected slice status, and lifecycle of the slices are monitored in the secure element managed by the operator, which can consequently improve/optimize the use of the slicing of the network. The secure element gets all the status changes relative to slices request made by the communication device while minimizing the power consumption of the card and of communication device. The implementation of the invention is part of the USIM-ME interface for any form factor of the USIM, thus including removable, embedded or integrated, which besides supports an application toolkit framework.

It is here noted that routing selection policy designates not only the currently defined URSP but also all routing selection policy types, e.g. proprietary or implementation specific rules, which can be later on defined by the standard or by other entities to select and route the communications in a sliced network.

URSP rules stored in an USIM are the standard way for PLMN to indicate the UE how to request a specific Route for a given PDU session including the Slice type/identity. However, it is also possible for a ME to be configured with other types of rules, i.e. proprietary rules, that allow the ME to select a slice versus a PDU session establishment request by an application. Such case could exists if, for instance, no URSP rules have been configured in the UE: neither on the USIM or in the ME.

The mechanism of the invention based on events sent by the ME to the USIM, when updated slice status and slice information occurred on the ME, is an efficient solution to minimize the power consumption while insuring a reliable knowledge at the secure element of the slice status. The Slice status and slice Information is thus available as EVENT as soon as the device is aware of slice status and slice information modification to be pushed to USIM to inform the USIM applications. This is particularly advantageous for constrained devices or devices in constrained network.

According to an advantageous feature, the method comprises a preliminary step, for the secure element, to register to a slice event defined in the USIM application toolkit framework supported by the communication device.

This enables an application needing to have such slice status and slice information to register to the associated event which means for the device that slice event need to be sent to the secure element.

According to another advantageous feature, the method further comprises the steps, for the secure element, to:
record the slice status and slice information,
based on the slice status and slice information, perform at least one process associated to the slice concerned by the slice status and slice information.

The invention indeed enables the secure element to start slice related processes when a slice request is accepted or rejected by the network without waiting for a command to do so. Typically some processes can thus be done in hidden time before the result of the process to be required by the network or the device. This is typically the case for anticipating time consuming computation.

It is here noted that the two above mentioned features can be combined according to the invention.

According to a specific application, the associated process comprises a combination of the slice status and slice information with at least one secure element configuration parameter previously defined and stored in the secure element.

Such an application leverages the presence, in a same entity, in near real time, of the secure element configuration parameters which can be very diverse and the slice status and slice information which is relevant for the associated process to be perform.

According to another specific application, the associated process comprises a slice availability statistics computation.

Such a computation is useful for many purposes of monitoring the availability of the slices depending on device environment in particular.

According to another specific application, the associated process comprises a computation of new rules for the route selection policy, said method further comprising the step to update, by the secure element, in its memory, the stored rules for the route selection policy (URSP rules).

Locally changing the priorities in URSP minimize the quantity of data exchanged on the air interface, which allows lower radio and network resources usage.

According to another specific application, the associated process comprises a cryptographic calculation involving the slice status and slice information and at least one cryptography configuration parameter of the secure element.

The invention enables to start time consuming processes while the result of the cryptographic calculation is not even yet requested. This enables to make such resource and time consuming processes in hidden time. The invention thus enables to anticipate cryptographic computation, e.g. SUCI calculation, onboard key generation, on first EVENT confirming slice availability before the application really use the slice and associated cryptographic computation.

It is here noted that all applications as above mentioned can be combined together. For example, among other combinations, the statistics calculation can be used for the URSP updating, and a combination of slice status and slice information with secure element configuration parameters can be performed in a cryptographic calculation.

The present invention also relates to a communication device having a secure element, said communication device being configured to monitor the management of network slices, said communication device being compliant with at least a technology implementing network slicing using a route selection policy, said communication device further supporting a USIM application toolkit framework implementing event download envelops, said secure element having a memory to store rules for the route selection policies, said communication device being active in a network of the technology implementing network slicing, it is further configured to receive a slice status and slice information from the network and pushing the slice status and slice information to the secure element using an event download envelop as defined in the USIM application toolkit framework supported by the communication device.

Such a communication device monitors the slice management, e.g. status, lifecycle, in an optimal way in terms of reliability of the slice status and slice information as provided to the secure element and in terms of power consumption.

The invention also relates to a secure element installed in a communication device configured to monitor the management of network slices with the secure element, said communication device being compliant with at least a technology implementing network slicing using a route selection policy, said communication device further supporting a USIM application toolkit framework implementing event download envelops, said secure element having a memory to store rules for the route selection policies, said secure element being configured to, when the communication device is active in a network of the technology implementing network slicing receiving a pushed slice status and slice information in an event download envelop as defined in the USIM application toolkit framework supported by the communication device.

Such a secure element is adapted to receive envelops dedicated to the slice status and slice information which prevent the secure element to have itself to request such information according to the prior art polling mechanism.

Advantageously, said secure element is configured to register at the device to a slice event defined in the USIM application toolkit framework supported by the communication device.

Such a registration enables the secure element to receive automatically the slice status and slice information as received by the communication device from the network.

Preferably, the secure element is configured to record the slice status and slice information and, based on the slice status and slice information, to perform at least one process associated to the slice concerned by the slice status and slice information.

Such a secure element has the possibility to trigger processes right away after the pushed reception of the slice status and slice information according to the invention.

Advantageously, the associated process is among the above mentioned ones.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed.

Other advantages and novel features will become apparent from the following detailed description when considered in conjunction with the drawings and the disclosed embodiments are intended to include all such aspects and their equivalents.

DETAILED DESCRIPTION

Figure 1:
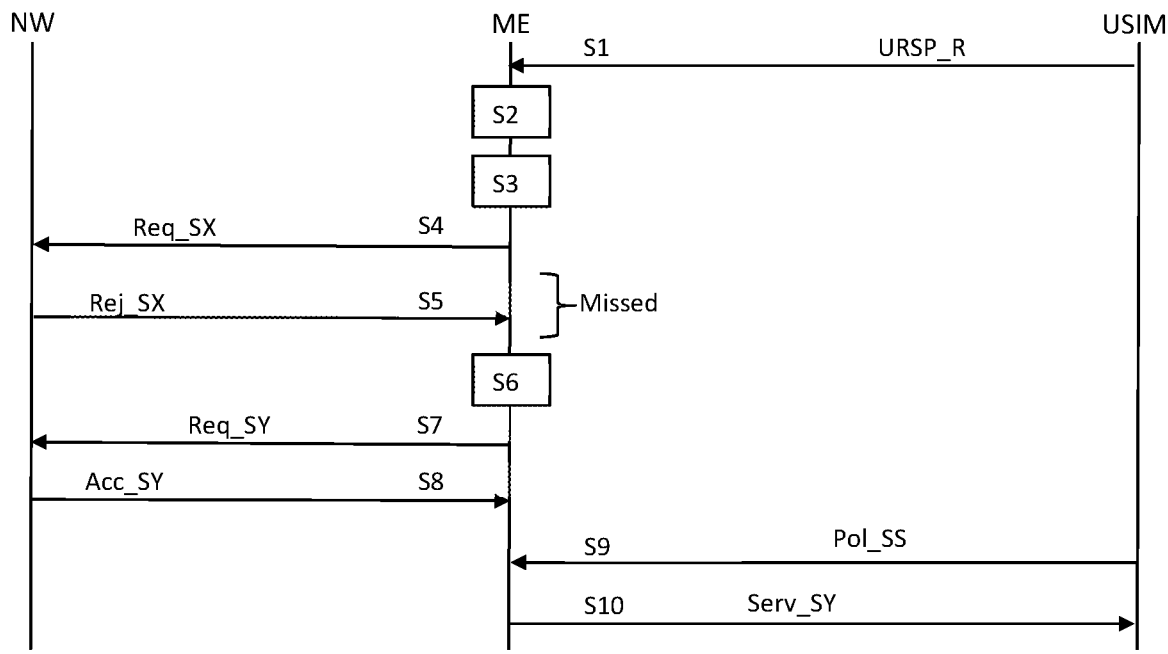
FIG. 1 shows a time diagram of a slice management mechanism of the prior art.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a time diagram of the slice management according to the prior art. The time diagram shows the exchanges relative to the invention between a network NW, a communication device ME and a secure element USIM. Said secure element USIM is typically a SIM card of any form factors, e.g. removable, embedded or integrated. It can also be a Trusted Execution Environment TEE or any type of secure element configured to store sensitive data on behalf of a third party, not being held by the user of the user equipment UE. Typically the USIM belongs to an operator of the network NW, which is typically a PLMN. Other kinds of network are however also targeted according to the invention.

The device is typically a terminal or a mobile equipment ME as defined in the ETSI or 3GPP standard documents.

In a first step S1, the ME is informed of the applicable rules of a UE routing selection policy URSP URSP_R stored in the USIM. It is here noted that the routing selection policies URSP are managed by operators that are in relation with the device. Thus the home network operator and a visited network operator can have influence on the content of the URSP. On the other hand the URSP rules in the USIM is currently controlled by the Home network operator but other configuration involving visited network could be contemplated in the future in specific situations.

Then an application requests a network access at the ME in a step S2. It is here noted that steps S1 and S2 can occur according to a different timing, S2 then occurring before S1. In a step S3, the ME evaluates URSP rules and select slice X. A slice request Req_SX is then sent by the ME to the network NW in a step S4. In answer, the network NW sends a rejection Rej_SX of the slice X request in a step S5.

3GPP Standard specifies only for USIM application, implemented in polling mode, to send on regular basis a PROVIDE LOCAL INFORMATION related to slices to get the current Served Slices.

Also it has to be noted here that, even if a polling event occurred quickly after the rejection of the slice, the USIM would never have been informed as the not allocated or rejected slice events are not considered in the polling mechanism. Only the granted slices are sent in response to current polling event, which restrict a lot the capacity of the secure element to monitor the connectivity behavior. Typically today, there is no means to monitor the rejection events and thus no means to establish statistics or any artificial intelligence in the USIM, for example to adapt the routing selection policy. Thus except if a periodic polling request is done from the USIM shortly after the reception of a slice acceptation, the USIM is never aware when slice status or information is updated in the ME based on information received from network.

In a step S6, the ME typically further evaluates another URSP rule to select a slice Y, e.g. a new request for a new PDU session establishment by an application within the ME using Slice Y. This triggers the ME to perform a step S7 of requesting slice Y Req_SY. Then, the network NW accept Acc_SY this request for the slice Y in a step S8. In the illustrative example of FIG. 1, a polling message for a slice status Pol_SS is sent shortly after the reception of the acceptation of the slice Y by the USIM in a step S9. The ME then answers to the USIM by informing it of the availability of the served slice Y Serv_SY in a step S10. It is here noted that if ever the slice Y was accepted, and no polling event occurred quickly after this acceptation, the USIM would have been informed only at the time of the next polling event and possibly out of the acceptation period. In such a case, the occasion to monitor the slice is lost.

It appears clearly with the illustrative example of FIG. 1 that the polling mode has the drawbacks to generate an over battery consumption linked to regular command to be sent from the USIM to the ME and to miss some Served Slices if slice status is not requested in the right timing. With the polling mechanism the information is available on a regular basis but not available when slice status and slice information is updated.

Furthermore when a specific slice is selected by the ME based on a URSP rule, and said slice is rejected by the network because of congestion on that particular slice, e.g. number of UE connected to that slice is too high, such information cannot be received by the secure element USIM, in existing polling mode as only the served slice information Serv_SY is currently sent to the USIM. Such served slice information is currently the only slice related information that a USIM can get.

Figure 2:
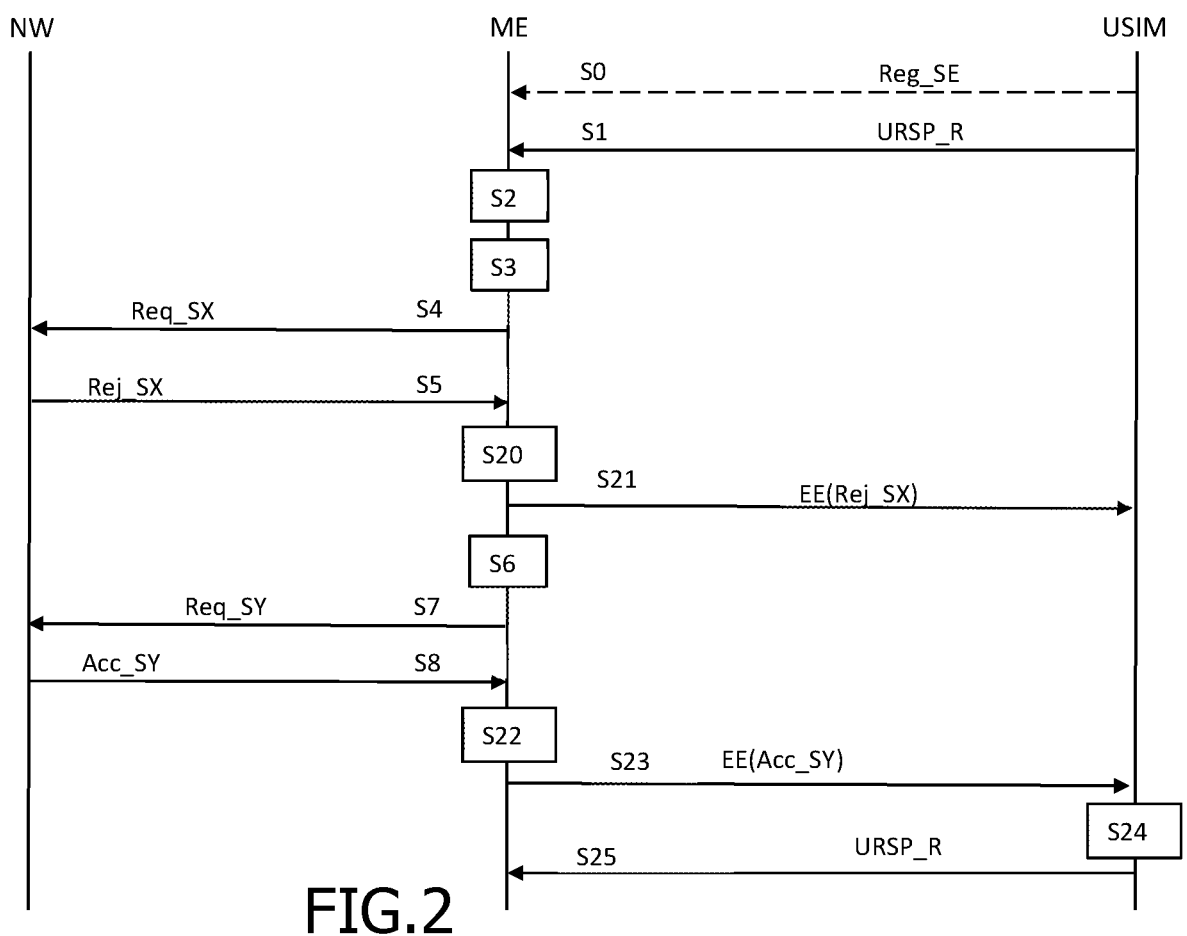
FIG. 2 shows a time diagram of a slice management mechanism of the invention.

FIG. 2 shows a time diagram of the method of the invention. According to this method, at step S5, the communication device ME prepares an Event Download envelop according to what is defined in an application toolkit in a step S20, said event download envelop. It contains the slice status and the slice information, i.e. the response received from the network NW relative to the network slice request sent from the device ME to the network NW. Here the status is Rejected and the information is a Single Network Slice Selection Assistance Information S-NSSAI of Slice X and a rejection cause.

The information pushed to the card in event envelop is a minima related to Slice status, i.e. Allowed, Rejected, Served, and Slice Information, i.e. a minima a S-NSSAI for corresponding slices. In case of rejection status, the cause of rejection is also included into Slice information coming from the Rejected NSSAI information element and/or the Extended rejected NSSAI information element when available as per 3GPP TS 24.501 which defines those information elements.

Such information are not available between the device ME and the secure element USIM on any other events already as currently standardized.

The device ME then sends the event download envelop EE(Rej_SX) to the secure element USIM in a step S21.

In details, the status for each slice could be:
allowed, advantageously associated to Single Network Slice Selection Assistance Information (S-NSSAIs) values that the ME may use in the Serving PLMN in the current Registration Area,
served, meaning that the requested slice is served by the network,
rejected, advantageously with a rejection cause.

The Slice information is:
Single Network Slice Selection Assistance Information (S-NSSAIs) is defined in document 3GPP TS 23.003 in clause 28.4.2. The S-NSSAI comprises a Slice Service Type (SST) referring to the expected Network Slice behavior in terms of features and services and a Slice Differentiator (SD) to differentiate amongst multiple Network Slices of the same Slice/Service type.
completed with rejection cause, in case of rejected status, defined as:
'S-NSSAI not available in the current PLMN or SNPN',
'S-NSSAI not available in the current registration area',
'S-NSSAI not available due to the failed or revoked network slice-specific authentication and authorization',
'S-NSSAI not available due to maximum number of UEs reached',
later specified rejection cause.

Per TS 31.111, currently, in addition to the set of events defined in ETSI TS 102 223 clause 4.7, the following event may also be reported to the USIM as soon as the USIM is registered to the corresponding event, each event being associated to a class as defined in the USIM application toolkit:
Network Rejection,
CSG cell selection (if class "q" is supported),
Incoming IMS Data (if classes "e" and "t" are supported),
IMS Registration (if classes "e" and "t" are supported),
Data Connection Status Change (if class "e" is supported),
CAG cell selection (if class "ag" is supported).

Letter classes and the corresponding command/function description is available in the standard documents.

The invention uses a class that was not used before, for example "ah", for the slice status event. This offers the opportunity to the secure element USIM to register to such a slice event. Step S0 of FIG. 2 illustrates such a preliminary registration of the secure element at the device ME, said device supporting the application toolkit.

Advantageously, the ME stores lists of Single Network Slice Selection Assistance Information (S-NSSAI) depending on the negotiations of the network. The tree main lists are Rejected S-NSSAI, which were rejected for the above-mentioned rejection causes, Allowed S-NSSAI, which can be asked and Served S-NSSAI, which are currently served by the network.

The invention enables to inform the secure element USIM of any update of one of these lists, an S-NSSAI being removed or inserted.

Thus, as soon as the Slice status event is part of an event list of the application toolkit, as set up by the last SET UP EVENT LIST command, see ETSI TS 102.223, then, when the ME detects a change in any S-NSSAI status, the device ME informs, according to the invention, the USIM, according to the invention, that it has occurred, using ENVELOPE (EVENT DOWNLOAD—Slices status) as described in the following.

Per TS 31.111, for the event list byte coding, the following value are defined in addition to those in ETSI TS 102 223 clause 8.25:
'11'=(I-)WLAN Access Status.
'12'=Network Rejection
'15'=CSG cell selection
'17'=IMS Registration
'18'=Incoming IMS data
'1D'=Data Connection Status Change
'1E'=CAG cell selection The invention uses a value that was not used before, for example '1F', for the slice status event.

In the following is presented an advantageous implementation of an event download envelop as used in the invention. The direction of the event download envelop is defined from the device ME to the secure element USIM. A TERMINAL PROFILE and command header of the envelop as specified in 3GPP TS 31.111 is advantageously used to implement the invention. In the TERMINAL PROFILE content is a list of the USIM application toolkit feature that are supported by the device ME. In the coding, in one of TERMINAL PROFILE byte, one bit is used to code the slice event feature according to the invention.

The following table illustrates the content in terms of command parameters and data of the associated Event Download Envelop Slice status as prepared by a device supporting class "ah" of the invention, a class indeed determining a set of features.

| Event download tag Length (A + B + C + D + E) |
|---|
| A: Event list B: Device identities C: Access Technology D: Slices status E: Slices information |

The event list data object contains information of associated event trigged, i.e. slice status. The device ME sets the event with the additional following data objects: Device identities, Access Technology, Slice status and Slice information.

Device identities data object are set to source=Network NW and destination=secure element USIM.

Access technology data object contains the access technology of the current serving cell. If the device is not camping on any cell, this data object shall not be present.

Slices status data object contains slice status chosen among:
  Rejected meaning that any new S-NSSAI is included to Rejected S-NSSAI,
  Allowed meaning that any new S-NSSAI is included to or removed from Allowed NSSAI,
  Served meaning that any new S-NSSAI is included to or removed from Served NSSAI.

Slices information data object contains list of corresponding S-NSSAI(s) completed with rejection cause in case of Rejected status.

If multiple change occur at the same time on Rejected, Allowed and/or Served S-NSSAI list, one event envelop for each status change is sent by the device ME.

As presented on FIG. 2, after the rejection of slice X, the ME then typically makes a request for another slice Y and get an acceptation for slice Y. Again, the device ME prepares an Event Download envelop according to what is defined in an application toolkit in a step S22. It then sends the event envelop EE(Acc_SY) having an envelop event SIM Toolkit command to the USIM in a step S23. It contains the slice status and slice information, i.e. the response received from the network NW relative to the network slice request sent from the device ME to the network NW. This time, the status is Accepted and the information is the S-NSSAI of Slice Y.

The slice status and slice information is then used by the USIM to enable processes linked to slice events, influencing in return the slice management at the ME.

Based on the received Slice Event from the device ME and configuration information in the USIM, the USIM can start to perform slice related processing.

In the example of FIG. 2, the secure element USIM adapts URSP rules to slice status and slice information and advantageously to historical slice status and slice information, in a step S24. These rules URSP_R are then sent in a step S25 to the device ME for the device to update the routing selection policy URSP to be used for the network slice management. Such an update of the URSP is advantageous for the device ME to have always a behavior adapted to the availability of the slices in real time. Based on the recorded status, the USIM typically computes a new priority order for the locally stored URSP rules and provide the prioritized URSP rules to the device ME. Any processes based on a combination of the content of the received Slice Event and of previously defined USIM configuration can take advantages from the invention. Typically such processes uses a slice identifier as received in the slice event to perform the process.

Other kinds of USIM processes take also advantages of the invention. Specifically, the invention is advantageously combined with processes associated to specific slice which take long period of time to be achieved.

Such processes are, in particular, onboard key generation, a Subscription Concealed Identifier (SUCI) calculation and any other processes implicating cryptographic calculation. Knowing as soon as possible when a slice has been selected is advantageously used to hide the processing time.

The reception of the event envelop of the invention advantageously triggers the USIM to start an onboard key generation process. Such a process is typically based on a Slice identity not available immediately in the prior art.

With the invention, as soon as the Slice request has been accepted by the network and the acceptation status received in the Event envelop at the secure element, the secure element can start to use key generation parameters, e.g. type of key/algorithm, key length, required quality of the key, to generate a key. Such keys may be used in end-to-end encryption process, device authentication, for example in IoT Safe feature, etc. . . . .

The Envelop command contains information relative to the slice that has been accepted, i.e. at least a Slice identity. The rest of the information needed for example for a key generation has been configured in the USIM by the owner of the keys, which is either the HPLMN or a third party different from the HPLMN.

With the reception of the slice status in near real time at the secure element USIM, it may start a SUCI calculation for a Slice requiring Network Specific Slice Authentication and Authorization, e.g. in the case of Slice SIM use case.

With the invention, the USIM can also compute in near real time a reliable Slice rejection rate. There is furthermore, with the invention, a possibility to calculate this rate per rejection cause, taking into account all rejected requests, which cannot be achieved with a polling mechanism where all rejected requests are possibly not known. QoS can consequently be improved by the USIM or a remote server when such a rejection rate can be computed. Based on the recorded slice status, the USIM computes advantageously an availability score for each slice.

With the invention, in general, the USIM is thus able to perform statistics of slice availability and to perform corresponding adjustment, typically in URSP rules, to improve faster connectivity to adapted QoS via a specific slice.

The invention enables the behavior of the secure element USIM to be changed without any delay regarding the slice availability. This obtained result will become more and more useful as the quantity of devices benefiting from a network slicing will increase.

Based on the slice status in near real time, the slice application can then, in case of rejection cause, inform a backend server that slice was rejected with associated rejection cause. The backend server can take action in real time in the network to prevent later rejection.

Based on the slice status in near real time, the slice application can also, in case of served S-NSSAI, check that slice differentiator SD (giving the current instance of the slice) in S-NSSAI is aligned with its data and/or power consumption. It can then inform without any delay a backend server, which can take action to prevent later such inappropriate slice allocation.

Also, in case of allowed S-NSSAI, application can check that URSP rules is properly followed.

In other advantageous implementation, the USIM, having all information regarding acceptance and rejection of the slices, informs a backend server of the operator of the PLMN, which can then consolidate collected slice status and slice information from multiple USIM and take action to update USRP for all related subscriptions.

The configuration parameters in the USIM to be combined with a Slice Event comprising a Slice identity and a Slice status are process specific configuration information.

USIM configuration parameters comprise type of key/algorithm, length of key, required quality of key for onboard key generation.

USIM configuration parameters comprise a public key of the Private Network for cyphering of the User Identity in the context of SUCI calculation.

USIM configuration parameters comprise a scoring algorithm based on slice availability or rejection rate, possibly sorted per rejection cause, for URSP rules reprioritization.

USIM configuration parameters comprise a period of information, a remote server address, requested information to be sent for informing a remote server of slice related statistics.

Such configuration parameters depend on the processes to be executed in the USIM as soon as the slice event is received.

In the advantageous embodiment illustrated on FIG. 2, the secure element USIM first provides the device ME with a first list of URSP rules with priority order 1. When the device ME sends to the USIM an EVENT STK command containing a slice status, i.e. the response received from the network relative to the network slice request sent from the device ME to the network, the secure element USIM records the status of the network slice requests. Based on the recorded slice status the USIM typically computes an availability score for each slice and, based on the computed score, the USIM derives a new priority order 2 for the URSP rules. The USIM then updates the URSP rules priority locally, according to the new priority order 2. At last, the USIM updates the ME with a second list of URSP rules with priority of order 2.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

What is claimed, is:

1. A method to monitor the management of network slices by a communication device, ME, having a secure element, USIM, said communication device being compliant with at least a technology implementing network slicing using a route selection policy, said communication device further supporting a USIM application toolkit framework implementing event download envelops, wherein said method comprising the steps of, for said communication device, ME, active in a network, NW, of the technology implementing network slicing:
   receiving by said communication device, ME, a slice status and slice information from said network, NW, said slice status being one of:
   slice served by said network, NW;
   slice allowed by said network, NW;
   slice rejected by said network, NW,
   said slice information referring to a list of slices corresponding to said slice status;
   detecting by said communication device, ME, a change in any slice status from the slice status stored in said communication device, ME;
   pushing by said communication device, ME, said slice status and said slice information to said secure element, USIM, by using an event download envelop as defined in said USIM application toolkit framework supported by said communication device, ME.

2. The method according to claim 1, comprising a preliminary step, for said secure element, USIM, to register to a slice event defined in the USIM application toolkit framework supported by said communication device, ME.

3. The method according to claim 1, further comprising the steps, for said secure element, USIM, to:
   record said slice status said slice information,
   based on said slice status and said slice information, perform at least one process associated to the slice concerned by said slice status and slice information.

4. The method according to claim 3, wherein said associated process comprises a combination of said slice status and slice information with at least one secure element configuration parameter previously defined and stored in said secure element, USIM.

5. The method according to claim 3, wherein said associated process comprises a slice availability statistics computation.

6. The method according to claim 3, wherein, said secure element, USIM, having a memory to store rules for the route selection policies, said associated process comprises a computation of new rules for the route selection policy, said method further comprising the step to update, by said secure element, USIM, in its memory, the stored rules for said route selection policy.

7. The method according to claim 3, wherein said associated process comprises a cryptographic calculation involving said slice status and slice information and at least one cryptography configuration parameter of said secure element, USIM.

8. A communication device, ME, having a secure element, USIM, said communication device, ME, being configured to monitor the management of network slices, said communication device, ME being compliant with at least a technology implementing network slicing using a route selection policy, said communication device, ME, further supporting a USIM application toolkit framework implementing event download envelops, said communication device, ME, being active in a network, NW, of the technology implementing network slicing, said communication device, ME, comprising a microprocessor being configured to;
   receive a slice status and slice information from said network, NW,
   said slice status being one of:
   slice served by said network, NW;
   slice allowed by said network, NW;
   slice rejected by said network, NW,
   said slice information referring to a list of slices corresponding to said slice status,
   detect a change in any slice status from the slice status stored in said communication device, ME;
   push said slice status and said slice information to said secure element, USIM, by using an event download envelop as defined in said USIM application toolkit framework supported by said communication device, ME.

9. A secure element, USIM, installed in a communication device, ME, configured to monitor the management of network slices with said secure element, USIM, said communication device, ME, being compliant with at least a technology implementing network slicing using a route selection policy, said communication device, ME, further supporting a USIM application toolkit framework implementing event download envelops, said secure element, USIM, comprising a microprocessor being configured to, when said communication device, ME, is active in a network of the technology implementing network slicing, receive a pushed slice status and slice information in an event download envelop as defined in said USIM application toolkit framework supported by said communication device, ME,
  said slice status being one of:
    slice served by said network, NW;
    slice allowed by said network, NW;
    slice rejected by said network, NW,
  said slice information referring to a list of slices corresponding to said slice status.

10. The secure element, USIM, of claim 9, said secure element, USIM, being configured to register at said communication device, ME, to a slice event defined in said USIM application toolkit framework supported by said communication device, ME.

11. The secure element, USIM, according to claim 9, said secure element, USIM, being configured to record said slice status and slice information and, based on said slice status and slice information, to perform at least one process associated to the slice concerned by said slice status and slice information.

12. The secure element, USIM, according to claim 11, said secure element, USIM, having a memory to store rules for the route selection policies, said secure element, USIM, being further configured to perform an associated process comprising a computation of new rules for the route selection policy and an update, in its memory, of the stored rules for the route selection policy.

13. The secure element, USIM, according to claim 11, said secure element, USIM, being further configured to perform an associated process comprising a combination of said slice status and slice information with at least one secure element configuration parameter previously defined and stored in said secure element, USIM.

14. The secure element, USIM, according to claim 11, said secure element, USIM, being further configured to perform an associated process comprising a slice availability statistics computation.

15. The secure element, USIM, according to claim 11, said secure element, USIM, being further configured to perform an associated process comprising a cryptographic calculation involving said slice status and slice information and at least one cryptography configuration parameter of said secure element, USIM.

* * * * *